United States Patent [19]
Nye et al.
[11] 3,783,199
[45] Jan. 1, 1974

[54] SWITCHING APPARATUS FOR SELECTIVELY INTERCONNECTING OILTATION MACHINES AND STATIONS

[75] Inventors: William M. Nye, Seattle; Stanley W. Jones, Bellevue, both of Wash.

[73] Assignee: Lanier Electronic Laboratory, Inc., Atlanta, Ga.

[22] Filed: Feb. 24, 1972

[21] Appl. No.: 229,083

Related U.S. Application Data

[62] Division of Ser. No. 49,432, June 24, 1970, Pat. No. 3,705,961.

[52] U.S. Cl. .......................... 179/100.1 DR, 179/6 E
[51] Int. Cl. ....................... G11b 19/00, H04m 11/10
[58] Field of Search ................... 179/100.1 DR, 6 E, 179/6 C, 18

[56] References Cited

UNITED STATES PATENTS

| | | | |
|---|---|---|---|
| 2,755,339 | 7/1956 | Logan | 179/100.1 DR |
| 2,200,351 | 5/1940 | Whitehead et al. | 179/6 E |

*Primary Examiner*—Raymond F. Cardillo, Jr.
*Attorney*—Jones & Thomas

[57] ABSTRACT

A plurality of central dictation systems are selectively interconnected between a plurality of dictate stations by way of a recorder selector switch and dictate station selector switches. Rotary stepping switches may be used as the selector switches. An off-hook dictate station condition causes a dictate station selector switch of an available recorder to hunt for the off-hook dictate station. After the dictate station is located, the recorder selector switch then hunts for the next available recorder. Another feature is that every other pulse of a rectified standard 60-cycle per second current is utilized, with the pulses spaced by a time interval sufficient to allow the control circuits and mechanical movements in both the switching apparatus and recorder-transcriber to effectively seize an available recorder-transcriber prior to the next pulse. The dictate station energizes a stepping circuit when the headset is raised (off-hook condition) only after a predetermined delay to preclude the stepping circuit from responding to simultaneous off-hook signals from multiple dictate stations. Only a portion of the rectified 60-cycle voltage is utilized in the control circuits so tat the maximum voltage capability of the transistor components in the circuits is not exceeded.

3 Claims, 4 Drawing Figures

SWITCHING APPARATUS FOR SELECTIVELY INTERCONNECTING OILTATION MACHINES AND STATIONS

This is a division of application Ser. No. 49,432, filed June 24, 1970 now U. S. Pat. No. 3,705,961.

BACKGROUND OF THE INVENTION

1. Field of the Invention

This invention relates to business dictating systems of the type employing an endless tape recording-transcribing machine and remote dictating and transcribing stations. Recording-transcribing systems of the type to which the present invention is specifically directed are described in U. S. Pat. Nos. 2,988,604 and 2,989,594. More particularly, this invention pertains to switching apparatus for selectively interconnecting a plurality of recorder-transcribers (hereinafter called recorders) with a plurality of dictate stations positioned at remote locations from the recorders.

2. Description of the Prior Art

The recorder-transcriber employed in these systems is a continuous-flow tape recorder-playback unit designed for complete remote-control simultaneously or separately from a dictate station and from a transcribe station. The recorder-transcriber comprises one or more tape-holding bins designed to hold loosely-folded sections of an endless magnetic recording tape several hundred feet in length, a tape transporting mechanism designed to move sections of the tape past recording and reproducing heads in response to control signals received from dictate and transcribe stations, and appropriate electrical or electronic circuitry necessary for operating the tape transport mechanism, and for recording information on and reproducing information from the tape. Heretofore, switching devices for selectively interconnecting recorders and dictate stations in associated circuits of this type have utilized numerous relays which are susceptible to malfunctions from dirty contacts and produce electrical interference, therefore being heard by dictators using the equipment.

Heretofore, standby operation of recorders has required continual monitoring by a supervisor who disconnected a desired recorder, thus making it unavailable for subsequent dictation. The only automatic device for making a machine unavailable due to the percentage of its capacity used, has required making the machine totally unavailable for dictation until the percentage of its capacity used has dropped to some smaller per cent. This was commonly referred to as a "lock out" and, even though all other available machines were in use or filled, the machine locked out could not be made available regardless, until the smaller percentage of capacity was reached. This resulted in the remaining capacity of the machine never being available in times of system overload.

SUMMARY OF THE INVENTION

It is an object of this invention to provide an automatic standby device which will make a machine unavailable for subsequent dictation when the capacity of the machine reaches some predetermined per cent of the machine's capacity. The machine will remain unavailable until all other available machines are in use or filled, or until the per cent of capacity in this particular machine drops below some smaller per cent of capacity.

In the preferred form of the invention, a two-position switch is employed, which is positioned by a capacity-sensing means which indicates the used capacity of the machine. This switch is interconnected into control circuitry for the recorder so that it is made unavailable for subsequent dictation until the switch is again moved to a position indicating a smaller percent used capacity of the machine, or until the control circuitry signals that all other available machines are in use or filled.

It is another object of this invention to provide an automatic switching apparatus that is easy to operate and maintain, utilizing every other pulse of a rectified standard 60 cps voltage to allow seizure between pulses, and effectively interconnects dictate stations to any available recorder in the shortest possible time.

It is another object of this invention to provide a switching apparatus which utilizes inexpensive standard power sources for timing stepping motors in searching for available recorders and/or off-hook dictate stations.

It is another object of the invention to provide a switching apparatus which utilizes available voltages in a unique manner to assure that the voltages in the control circuits do not exceed the allowable specifications of the electronic components utilized, and yet provide adequate voltages for proper operation of stepping switches.

It is still another object of the invention to provide a delay after a handset is moved off-hook so that multiple off-hook stations do not result in continuous searching.

It is another object to provide accurate voltages for critical timing sequences from a wide range of voltages so that the dictator may seize a recorder in the shortest possible time, and without interference to other dictators.

DESCRIPTION OF THE PREFERRED EMBODIMENTS

Figure 1:
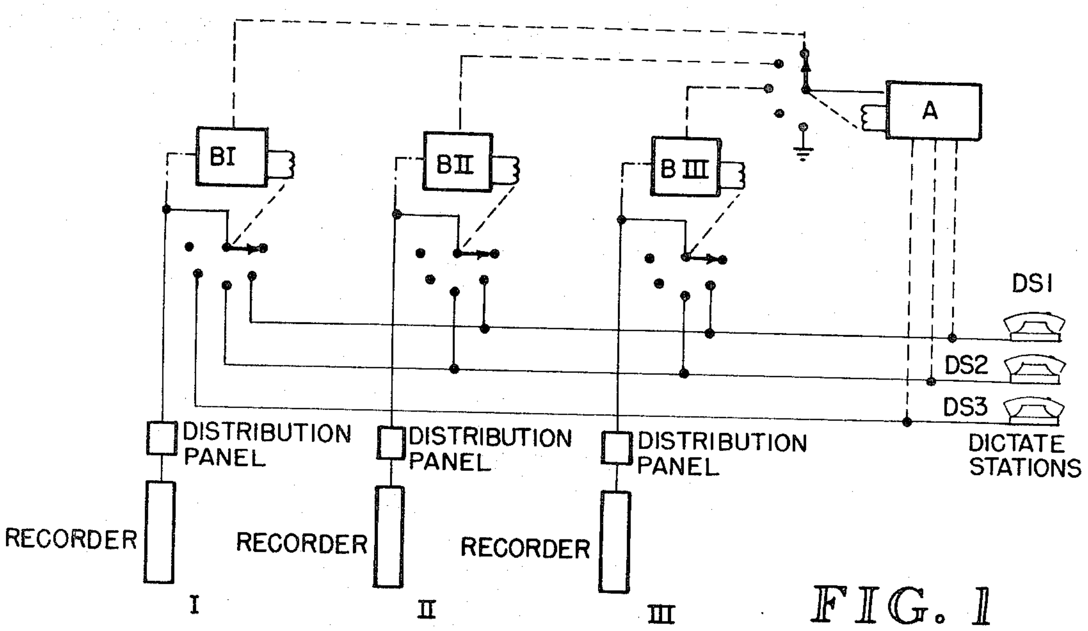
FIG. 1 is a basic block diagram illustrating the preferred switching system embodying the principles of the invention.
Figure 3A:
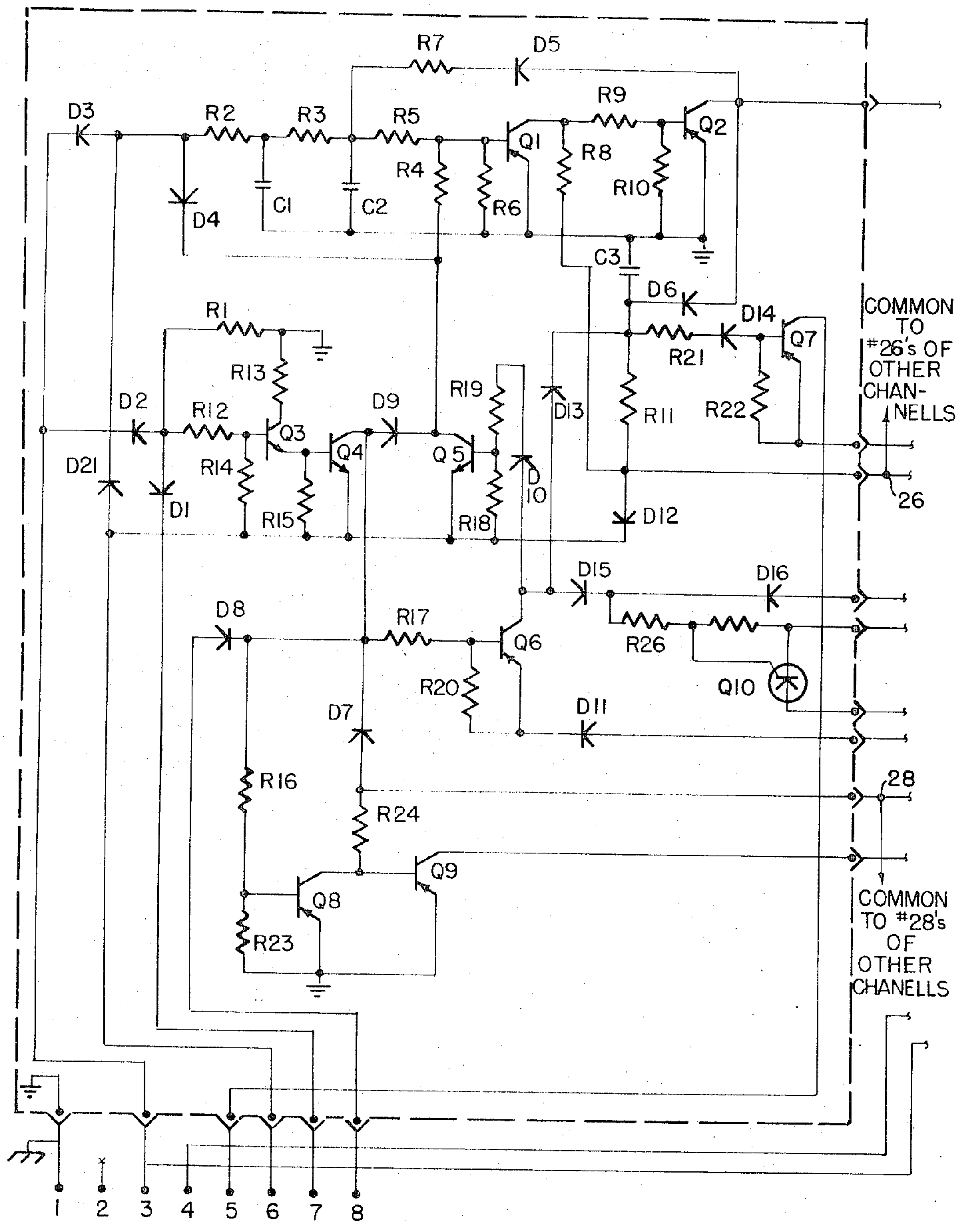
FIGS. 3A and B are wiring schematics for a switching apparatus embodying the principles of this invention.
Figure 3B:
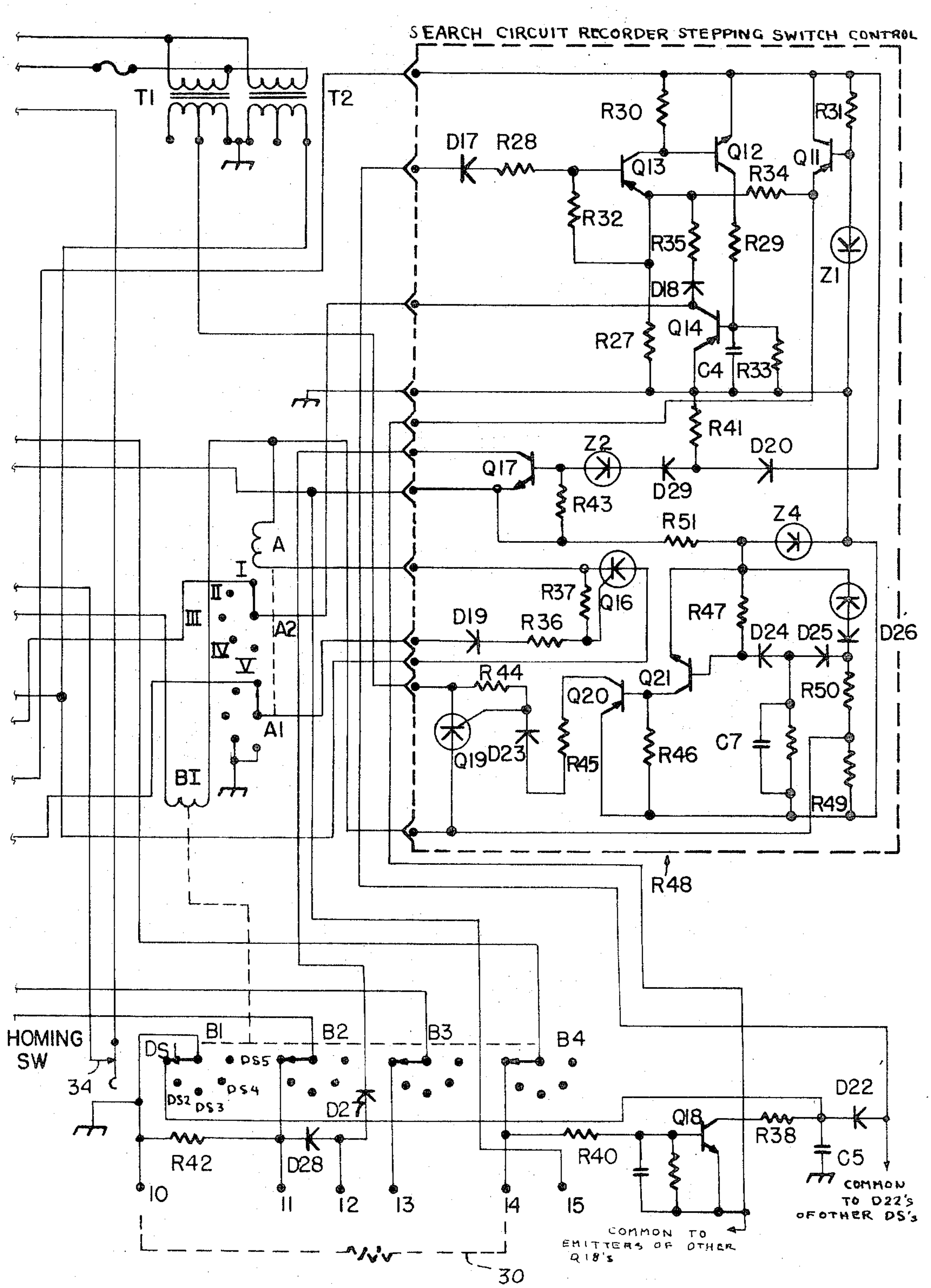

As best shown in FIG. 1, the automatic switching apparatus is best employed for secretarial pool type installations to connect a large number of dictate stations to a plurality of recorders. Whereas only three recorders, namely, I, II and III, and three dictate stations, namely DS1, DS2 and DS3, are shown it should be understood that larger numbers of recorders an/or dictate stations may be employed. A block diagram of FIG. 1 illustrates the basic mode of operation of the switching apparatus. When a dictate station handset is raised, i.e., made off-hook, a signal is sent to the search-circuit A to step two ganged arms A1, A2 over contacts connected to various recorder channels I, II, III, etc. Once the switch arms reach contacts connected to an available recorder, a signal is sent to a dictate station stepping switch control circuit BI, BII, BIII or etc. associated with that recorder to cause that stepping switch to search for the off-hook dictate station. Once the off-hook dictate station contacts on the dictate station stepper switch are reached, the recorder is seized resulting in a signal to the search circuit A to advance to the next available channel. In other words, there is one search circuit recorder stepping switch A for the switching apparatus, and a dictate station stepping switch B for each channel or recorder. In FIG. 3, only one of the dictate station stepping switches, namely BI, is illustrated for clarity, it being understood that the remaining dictate station stepping switches operate in an identical manner.

Figure 2:
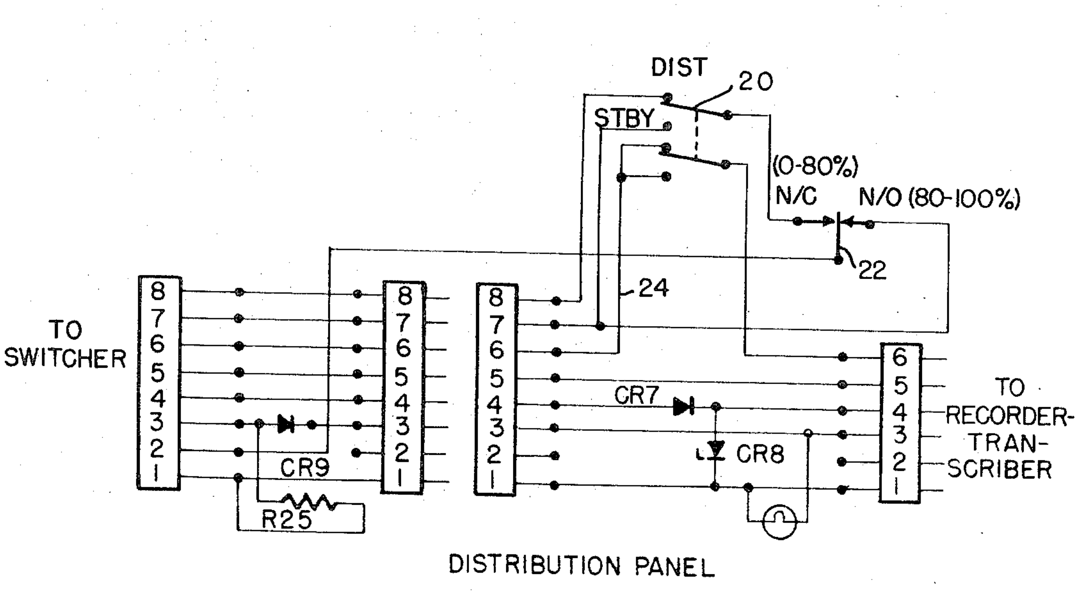
FIG. 2 is a wiring schematic illustrating the automatic standby feature of the invention, it being undersood that this wiring is interconnected between the switcher illustrated in FIGS. 3A and B and a recorder.

In FIG. 2, a manually-operated distribute standby switch 20 and an automatic standby switch 22 are illustrated. The terminals 1-8, going "to switcher" in FIG. 2, are connected to terminals 1-8 of the switching circuit shown in FIG. 3. The terminals 1-6 "to recorder" in FIG. 2 are connected to a recorder in a manner to provide the various functions to be described. The automatic standby switch 22, in the preferred embodiment, is a two-position switch that is energized by a sensing means (not shown) which indicates the amount of dictated, but untranscribed, tape in a particular recorder. The sensing means may be of any suitable type having sufficient power to position the switch contacts such as by using a relay in which the switch contacts of the automatic standby switch 22 are relay contacts. Assuming the capacity of a machine is 100 percent, the sensing means will be made to place the switch arm of the switch 22 in the position shown when the used capacity of the machine is less than some predetermined percent, such as 80 percent, and will move the switch arm to the right, as shown in FIG. 2, when the used capacity of the machine is over 80 per cent. As will be described in more detail hereinafter, it is the purpose of this automatic standby switch to make the recorder unavailable for subsequent dictation when the position of the switch is at the right unless all other machines are in use or are full.

In FIG. 2, the manual distribution-standby switch 24 is shown in the distribution mode. With the recorder on, minus 24 volts from the recorder's number 6 lead is supplied through conductor 24, distributor-standby switch 20 to Q3, Q4, and through D12 to line 26, and out to terminal 15. terminals 10, 11, 12, 13, 14 and 15 are connected to each of the dictate stations in parallel. Q3 turns on with ground through R1 and R12 to its base. Q3 turns Q4 on. Q4 turns on Q8, and supplies −24v. to conductor terminal 8. Q8's conduction keeps Q9 off, so recorder stepping switch A will not step. Minus 24v. supplied through D8 of terminal 8 goes out of the switch arm of the manual switch 20 and, since the arms of these switches (one switch per channel) are tied together through common terminal 2, −24v. is present on the arm of every other channel. If the switch arm in the switch 20 of another channel is in standby position, the lower position as shown in FIG. 2, −24v. will be applied to terminals 7 of that channel, through D1, holding W8 and Q4 of that channel off. With Q4 off, Q8 will be off, so Q9 can turn on causing the recorder stepping switch A to step by this standby channel. If all channels having their manual switches 20 in the distribute mode are in use, −24v. is removed from the arms of the manual switches 20. This allows Q3, Q4, and Q8 of the standby channels, to turn on. With the Q8's on, Q9's will turn off, allowing the recorder stepping switch A to stop on the standby channels. If a recorder is full, the recorder number 6 terminal will be Ov., so that Q3 and Q4 will be off, and Q9 will be permitted to turn on. If the recorder is in use by another dictate station, recorder number 3 terminal is at −24v., due to internal circuitry in the recorder, and will apply this voltage through D2, turning off Q3 and Q4. Common −24v. from conductors 26 is applied to emitter of Q17, and also to number 15 terminals of the dictate stations. If common conductors 28 become Ov. (all channels in use), Q17 conducts from emitter to base, through Z2, D29, and R41 to ground. This causes Q17 to conduct from emitter to collector, apply −24v. through D27 to terminal 12 of the dictate station.

Searching for Dictate Stations

Lifting the handset from the cradle in a dictate station (off-hook), connects a load (in dictate station as shown in dotted lines 30) from number 14 terminal to number 10 terminal. This allows a ground to be coupled through the load 30 and through R 40 to base of Q18, turning it on. Q18 supplies −18v. through R38 to charge capacitor C5. When C5 is charged to about −13v., it causes current flow through D22, D17, and R28, turning on Q13. Q13 turns on Q12 which turns on Q14, applying ground from collector of Q14 through stepper switch contact A2. This ground is coupled through D11, Q6, D15, and R26 to the gate of SCRQ10, turning it on. When Q10 is on, AC from the 48v. tap of a transformer T2 flows through Q10, through coil B1, through Q19, to the 24v. tap of T1. Thus 72v. rectified AC is applied to coil B1 (dictate station stepping switch) causing the switch arm to step. The speed of the stepping switch is 30 cps and is regulated by Q19, which is controlled by a frequency divider circuit. An important feature of this invention is that an available 60 cps voltage is utilized to provide sufficient voltage to drive the stepping motors, but is divided so that only every other rectified half-cycle is employed. This spaced the pulses to the stepping motors to a speed of thirty cycles per second, which allows the electrical components of the remaining control circuits and mechanical movements to complete their functions prior to the stepping motor's receiving the next pulse. Another important feature is the relationship of the capacitors C5, one for each dictate station, to the timing of the stepping rate. Since several hand sets may be off-hook simultaneously the charge rate of the capacitors must be such that the time required for each of the capacitors to become charged to −13v. is greater than the time required for one revolution of the stepping switch BI, BII, etc. This assures that a stepping switch will lock on the first capacitor in the off-hook sequence prior to initiation of another revolution. Only a remote probability exists that the capacitors C5 of two or more off-hook dictate stations will simultaneously reach a charge of −13v., since such coincidence requires simultaneous off-hook occurrence and exactly identical components. If such coincidence does occur, however, stopping of the stepping switch will be controlled by the last-reached dictate station having its capacitance C5 charged to −13v. Another cycle of searching will then be initiated for the remaining off-hook dictate station.

Before searching, Q6 has minus volts applied to its base through R17, from the collector of Q4. During search, Q5 turns on, supplying minus D9 through E9 to R17, and also through R4, which turns on Q1, disabling a homing circuit, to be described. During search, the collector of Q6 also supplies ground through D12 to turn off Q7, which opens a connection from recorder number 5 lead through the dictate station stepping switch B1, to number 14 terminal of the dictate station, to prevent connection to the wrong station. In this regard terminal number 14 must be −24v. and terminal number 3 must be ground for seizure. When the dictate station stepping switch B1 reaches a station off-hook, the arm connected to terminal 10 discharges capacitor C5 which turns off the search circuit. The dictate station at this time is connected to a recorder. It is important to note that the −18v. supplied to the emitter of Q18 comes from Q11, which is held at a constant 18v. regardless of the voltage supplied through the conductors 28, which may vary widely, depending upon the number and type and spacing of the other recorders. The −18v. is supplied whenever there is a channel available and Ov. when all channels are in use.

Seizing Recorder-Transcriber

When the off-hook dictate station seizes the recorder, −24v. is supplied to the recorder number 3 terminal through D3, to junction of R2, D2, and D21. Minus 24v. through D21 and D12 supplies power to the collector of Q1. Minus 24v. through D2 turns off Q3. Minus 24v. through R2 charges C1 and turns on Q1 through R3 and R5, which disables the homing circuit, to be described. Also, when recorder is seized, Q9 is allowed to turn on, supplying a ground to stepping switch arm A1. (Q9 turns on because Q3, Q4, Q8 are off.) The ground on the switch arm A1 is passed through D19 and R36, turning on SCRQ16. When Q16 is on, rectified AC voltage from the 48v. tap of transformer T2 flows through Q16, through stepper switch A coil, through Q19, to the 24v. tap of T1. Seventy-two volts rectified AC is applied to coil A, causing the switch to step to the next available channel. If all channels are in use, the stepping switch does not step. It is important to note, that although 72v. rectified AC is made available to step the stepping switch, the transistor components of the circuit see only 24v. Ac, 35v. peak, and thus standard transistors may be used throughout.

Switching Apparatus Going Home

When the tictate station is hung-up after use, a recorder is unseized, removing the −24v. from the recorder number 3 terminal. C1 begins discharging through R3, R5, Q1 base to emitter, keeping Q1 turned on for approximately 2–8 seconds, which keeps Q2 (homing circuit) off for the same amount of time. When C1 is discharged, Q1 turns off, allowing Q2 to turn on, supplying a ground through the homing switch 34, turning on Q10, which steps the stepping switch. The switch steps until it reaches home position (a set of contacts with no dictate station terminals connected), at which time a mechanical arm opens the homing switch. D5 and R7 provide a feed-back path from the collector of Q2 to C1, through R3. When Q2 begins to turn on, it helps C1 discharge faster, to insure Q1 turns off quickly and completely. While the stepping switch B1 is stepping toward home, Q2 supplies a ground through D6, turning off Q7, which opens a connection from the recorder number 5 terminal to the dictate station stepping switch arm connected to number 14 terminal. This prevents connection to any dictate stations in use on another recorder. If the recorder is filled, while dictating, −24v. is removed from the recorder number's 6 and 3 terminals. C1 discharges rapidly, through D21, sending the stepping switch B1 home. The next available recorder then searches for a dictate station.

Returning now to the automatic standby feature of invention, it will be noted that a channel is available for seizure by a dictate station when Q3 and Q4 are on, applying a −24v. to conductor 27. The several conditions, already mentioned, when conductor 28 is at OV., namely when Q3 and Q4 are off, occur when a machine is full (number 6 terminal Ov.), when a recorder is in use (number 3 terminal at −24v.), or the manual switch 20 for that channel is in standby position, and another channel is available for use (terminal 7 at −24v. from terminal 8 through switch arm of distribution switch 20--all channels number 2 terminal connected to the switch arm). It was also seen that if the number 8 terminal was Ov. because all available recorders were in use or filled, the −24v. would not appear at the number 7 terminal of the channel in the manual standby mode, thus allowing the recorder stepping switch A to now stop on that standby channel.

In the automatic standby switch 22, the common number 2 terminal connected to the switch arm of the manual distribution switches 20, is connected through the switch contacts of the automatic standby switch 22 to the number 8 terminal if the manual switch is in the distribute mode, or to the number 7 terminal if in the standby mode. If the manual switch is in the distribute mode and the predetermined capacity of the recorder has not been reached so that the switch contacts of the automatic standby switch 22 are in the position shown, the channel functions as previously described in the distribute mode. If the manual switch 20 is in the standby mode, the recorder functions as in the standby mode previously described. In either mode, when the switch contacts of the switch 22 invention has moved to the right in response to the sensing means in the recorder, indicating that a predetermined percentage of the capacity of the recorder has been used, the terminal number 2 is connected directly to terminal number 7, thus automatically placing the recorder in the previously-described standby mode. It should be readily apparent that use of an automatic standby as described eliminates the need for a supervisor to monitor the capacity conditions of each of the recorders, and optimizes the available capacity of each recorder.

While the preferred form of my inventionhas been illustrated and described it should be understood that variations will be apparent to one skilled in the art. Accordingly, it is intended that the invention not be limited to the specific form illustrated but that the claims appended hereto be given the broadest interpretation possible.

The embodiments of the invention in which an exclusive property or privilege is claimed are defined as follows:

1. Apparatus for selective interconnection between a plurality of dictation recorders and a plurality of remote dictate stations, comprising:

a first switch means selectively operative to engage each one of said dictation recorders in sequence;

a dictate station switch means associated with each of said remote dictate stations, each dictate station switch means selectively operative to establish circuit interconnection between the corresponding dictation recorder and any of said dictate stations;

signal means in each of said dictate stations operative in response to a circuit condition in said dictate station to provide a control signal condition to the dictate station switch means corresponding to the particular dictation recorder engaged by said first switch means;

operating means associated with each of said dictate station switch means and operative in response to said control signal condition for advancing the corresponding dictate station switch means to a switching condition establishing circuit interconnection between such dictate station and the particular dictation recorder;

means operative in response to said establishment of circuit interconnection to advance said first switch means to engage the next available one of said dictation recorders; and delay means in circuit with each said operating means and operative to delay said advancement of the corresponding dictate station switch means for a time in excess of a predetermined time corresponding to the time required for one complete operative cycle of any of said dictate station switch means.

2. A solid state switching device for selectively interconnecting a plurality of recorder-transcribers to a plurality of remote dictate stations comprising a first stepping switch selectively operative to engage said recorder-transcribers in sequence; a plurality of second stepping switches, one for each recorder-transcriber, for selectively connecting a dictate station to the corresponding recorder-transcriber; means in a dictate station operative in response to an off-hook condition in said dictate station indicating desired seizure of a recorder-transcriber to provide a signal condition to said second stepping switches; means operative in response to said signal condition for advancing a one of said second stepping switch corresponding to an available recorder-transcriber until said one second stepping switch establishes circuit connection to the off-hook dictate station, means operative in response to said established circuit condition of the available recorder-transcriber and the off-hook dictate station for advancing the first stepping switch to the next available recorder-transcribed, said means for advancing said second stepping switch being operative in response to every other pulse of a rectified standard 60 cps current, said pulses being spaced approximately at 30 cycles per second intervals and said second stepping switch advancing means includes means operative to commence the advance of the said one second stepping switch only after a time delay of length greater than the time required for one complete operative sequence of any of said second stepping switches.

3. The switching circuit of claim 2 wherein said means operative to advance said one second stepping switch includes capacitive time delay means, and further including means for supplying said capacitive time delay means with a constant voltage so that timing functions are accurate and independent of the widely varying availability voltages from the other recorder-transcribers.

* * * * *

UNITED STATES PATENT OFFICE

CERTIFICATE OF CORRECTION

Patent No. 3,783,199 Dated January 1, 1974

Inventor(s) William N. Nye and Stanley W. Jones

It is certified that error appears in the above-identified patent and that said Letters Patent are hereby corrected as shown below:

In the Title, that portion reading "OILTATION" should read --DICTATION--.

Signed and sealed this 21st day of May 1974.

(SEAL)
Attest:

EDWARD M.FLETCHER,JR.
Attesting Officer

C. MARSHALL DANN
Commissioner of Patents